United States Patent
Wilsher et al.

(10) Patent No.: US 7,403,973 B2
(45) Date of Patent: Jul. 22, 2008

(54) MANAGING DEVICES AND MESSAGES FOR USERS DURING A MESSAGING SESSION

(75) Inventors: Thomas Wilsher, San Francisco, CA (US); Kalpak Kothari, Chicago, IL (US); Zhou Ye, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 988 days.

(21) Appl. No.: 10/857,555

(22) Filed: May 28, 2004

(65) Prior Publication Data

US 2005/0278425 A1   Dec. 15, 2005

(51) Int. Cl.
*G06F 15/16* (2006.01)

(52) U.S. Cl. .................. 709/206; 709/207; 709/223; 709/225; 709/229; 709/230

(58) Field of Classification Search ................ 709/206, 709/207, 223, 225, 229, 230
See application file for complete search history.

(56) References Cited

U.S. PATENT DOCUMENTS

| | | | | |
|---|---|---|---|---|
| 6,587,458 B1 * | 7/2003 | Burg et al. | ................ | 370/356 |
| 6,690,773 B1 * | 2/2004 | Law | ................ | 379/88.22 |
| 7,042,876 B1 * | 5/2006 | Jayasenan et al. | ................ | 370/389 |
| 7,058,586 B1 * | 6/2006 | Law | ................ | 705/5 |
| 7,155,231 B2 * | 12/2006 | Burke et al. | ................ | 455/450 |
| 7,167,701 B1 * | 1/2007 | Jordan, Jr. | ................ | 455/412.2 |
| 7,212,617 B2 * | 5/2007 | Owens et al. | ................ | 379/93.24 |

* cited by examiner

*Primary Examiner*—Liangche A Wang
(74) *Attorney, Agent, or Firm*—Townsend & Townsend & Crew LLP

(57) ABSTRACT

A messaging session is established between a first user and a second user where messages are sent from a first user using a first device to a second user using a second device. During the messaging session, the second user may decide to use a third device. A presence update may be received that specifies the third device. Messages sent from the first user are then routed to the second user at the third device. These messages are routed without the second user having to manually start a new messaging session with the first user.

52 Claims, 5 Drawing Sheets

MANAGING DEVICES AND MESSAGES FOR USERS DURING A MESSAGING SESSION

CROSS-REFERENCES TO RELATED APPLICATIONS

The present application incorporates by reference for all purposes the entire contents of U.S. patent application Ser. No. 10/684,686, entitled "Intelligent Messaging", filed Oct. 13, 2003.

BACKGROUND OF THE INVENTION

The present invention generally relates to messaging and more particularly to techniques for processing messages during a conversation between users.

Advances in technology have created many ways of communicating with users. For example, users may communicate using email, instant messaging (IM), short message service (SMS), multimedia service (MMS), facsimile (fax), voice, etc. Users may have any combination of devices that communicate using the above methods.

An instant message (IM) conversation is typically between two instant message clients for two users having the conversation. The IM clients may be, for example, running on personal computers. At some point during the conversation, a user may want to switch to another device but continue the conversation with the other user. For example, a user may want to use a mobile device, such as a cellular phone with an IM client, to continue the IM conversation with the other user. However, the user cannot continue to send messages in the same conversation that was initiated using the IM clients on the personal computers. Rather, the user would have to manually reconnect to the other user to start a new conversation using the cellular phone with the IM client. Accordingly, the original conversation is terminated and a new conversation is started with the new device.

The above process includes many disadvantages. For example, whenever a user desires to change devices, the original conversation is ended and a new conversation is started with the new device. This requires manual steps by the user to start a new conversation. Also, when a user switches devices, the new device may not have the same capabilities as the old device. Thus, the user may not be able to even communicate with the other user using the new device.

BRIEF SUMMARY OF THE INVENTION

The present invention generally relates to processing messages during a messaging session between users. In one embodiment, a messaging session is established between a first user and a second user where messages are sent from a first user using a first device to a second user using a second device. During the messaging session, the second user may decide to use a third device. In one embodiment, a presence update is received that specifies the third device. Messages sent from the first user are then routed to the second user at the third device. These messages are routed without the second user having to manually start a new messaging session with the first user.

In one embodiment, a method for processing messages during a messaging session is provided. The method comprises: maintaining a mapping between a first device and a second device for the messaging session; determining an update for the mapping, the update specifying a third device that is being used instead of the second device; updating the mapping based on the update determined; receiving a message from the first device during the messaging session; determining, from the updated mapping, that the message should be sent to the third device; and sending at least a portion of the message to the third device.

In another embodiment, a method for maintaining a messaging session between a first user and a second user is provided. The method comprises: establishing the messaging session between the first user for a second user, wherein messages are sent between a first user at a first address and a second user at a second address; determining an update for the second user specifying a third address; and maintaining the messaging session between the first user and second user, wherein messages are sent between the first user at the first address to the second user at the third address.

In yet another embodiment, a method for processing messages for a user is provided. The method comprises: receiving a first message for the a first user from a second user; sending at least a portion of the first message to the first user; receiving a second message for the first user from the second user; determining if the at least a portion of the first message sent to the first user has been read or replied to; if the at least a portion of the first message has not been read or replied to, performing the steps of: retracting the at least a portion of the first message; combining the at least a portion of the first message and at least a portion of the second message into a third message; and sending the third message to the first user.

In another embodiment, a system for processing message is provided. The system comprises: a first set of devices associated with a first user; a second set of devices associated with a second user; and a message delivery system configured to route messages between the first user and the second user, the message delivery system comprising: a messaging session initiator configured to generate a mapping to map messages from a first device in the first set of devices to a second device in the second set of devices and the messages received from the second device to the first device; and an updater configured to update the mapping to map messages from the first device to a third device in the second set of devices and the messages received from the third device to the first device; wherein a messaging session between the first user and second user is maintained after the updater updates the mapping.

In another embodiment, a computer readable medium is provided that includes logic to perform techniques described herein.

A further understanding of the nature and the advantages of the inventions disclosed herein may be realized by reference of the remaining portions of the specification and the attached drawings.

DETAILED DESCRIPTION OF THE INVENTION

Figure 1:
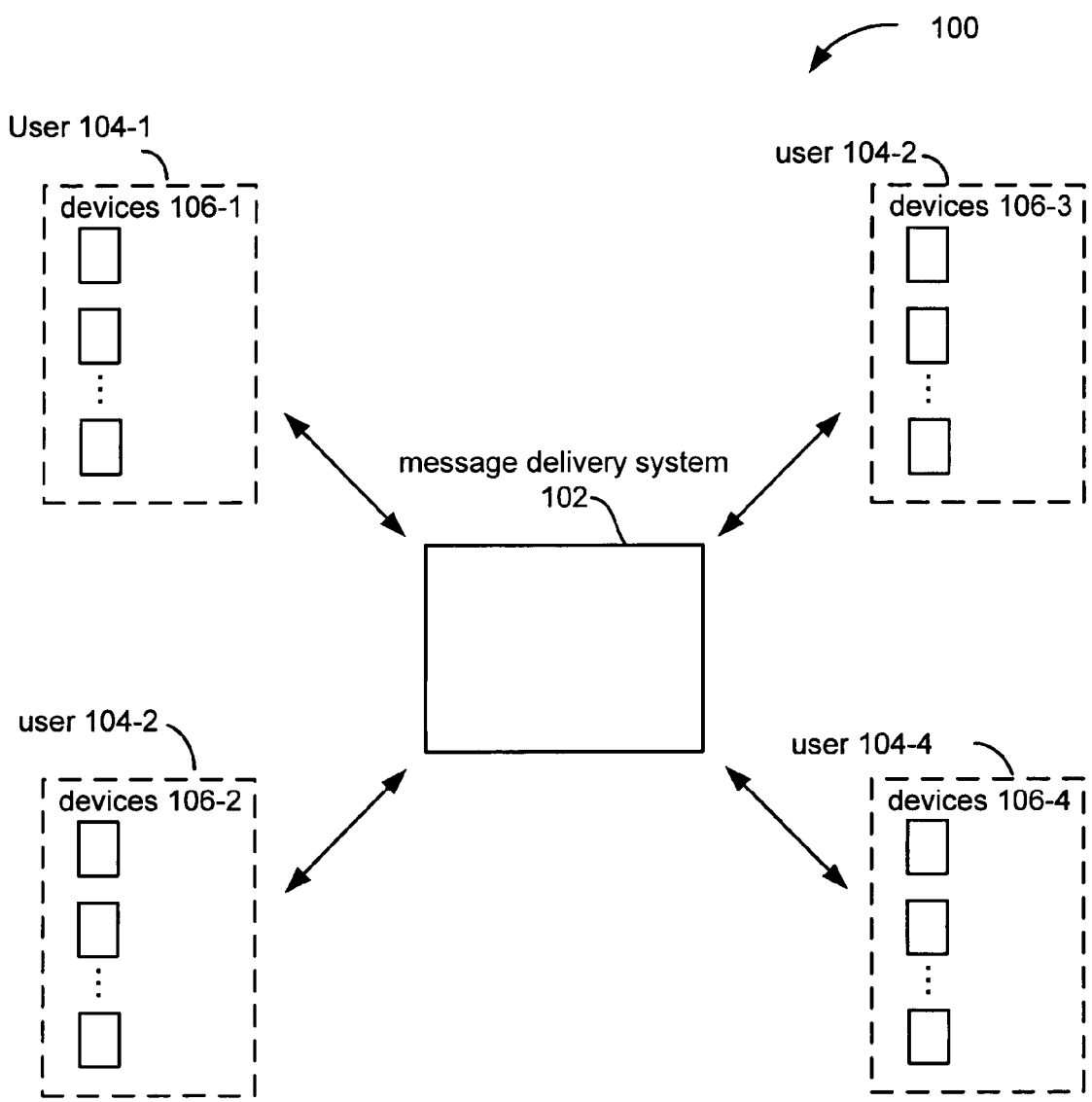
FIG. 1 depicts a system for processing messages according to one embodiment of the present invention.

FIG. 1 depicts a system for processing messages according to one embodiment of the present invention. As shown, system 100 includes a message delivery system 102 and a plurality of devices 106. A plurality of users 104 are each associated with devices 106. For example, a first user 104-1 is associated with devices 106-1, etc. Devices 106 may include software, hardware, or any combination thereof configured to allow communication of messages. For example, if a device is configured and communicate through instant messages, the device may include an IM client that is used to send IMs.

Devices 106 may include any devices that are capable of sending messages to other devices. For example, devices 106 include a cellular phone, personal digital assistant (PDA), laptop, workstation, personal computer, blackberry device, good link device, or any other computing device or mobile device.

In one embodiment, a device 106 may be defined by a communication channel and address. A communication channel may refer to the type of messages that are sent. For example, there may be an IM communication channel, SMS communication channel, etc. Each communication channel may communicate using a different protocol and/or message format. A communication channel may include any network configured to communicate in a communication type. For example, an IM communication channel may be an IM network configured to send IMs, an SMS communication channel may be a network configured to send SMS messages, etc.

The user may have a separate device 106 for each communication channel but it will be understood that multiple devices 106 may be used to communicate in multiple communication channels. For example, a cellular phone may communicate using instant messaging, voice, SMS, and MMS. Also, a computer may be used to communicate through email and instant messaging.

In one embodiment, a user is associated with one or more addresses for each communication channel. An address is an identifier or username that uniquely identifies the user for the given communication channel. For example, an email address is used to contact a user through an email channel, a username for an instant message client is used to contact the user through an IM channel, a cellular phone number is used to contact the user through voice, SMS, and MMS, etc.

When a device is referred to, it will be understood that the device is meant to refer to any device that a user can be contacted on. For example, a user may receive email using any computer and that the device determined does not need to be a device the user may physically use to receive the message. A device in this respect may be any computing device that can receive an email for a user at an email address. Also, an SMS device may be any device that can receive an SMS message at a cellular phone number.

Referring to a device may also mean an address for a user. For example, when a message is sent to a device, the message is sent to an address. Network elements are then configured to send the message to a device associated with the address. For example, when it is referred to as sending a message to the cellular phone device 106, it will be understood that this may mean a message is sent to an address in a communication channel and that message is routed to the device.

Also, a physical device may appear as multiple devices. For example, a cellular phone may be enabled to use SMS and IM. Accordingly, when a first and second device are described, it will be understood that the same physical device may be used but a different device is being used in that the first device communicates using an address in an SMS communication channel and the second device communicates using an address in an IM communication channel.

Message delivery system 102 is configured to process messages during a messaging session between two or more users. In one embodiment, a messaging session may be a conversation or a chat between two users. Once the session is initiated, the users do not have to manually reconnect to continue to send messages to each other. For example, a user #1 manually initiates a messaging session with a user #2 (or any number of users). User #1 may enter an address of user #2, reply to an earlier message, etc. to initiate the messaging session. User #2 can now send messages to user #1 without having to manually enter an address of user #1. For example, user #2 can reply to the message sent.

In one example, during an instant message messaging session, messages may be displayed on an IM client for both users. The connection is first made by a user sending an IM to a second user at the second user's IM username. If the user is logged on at an IM client, a messaging session may be initiated between the IM clients for the first and second users. In this session, users can send messages to each other using the IM clients. In another embodiment, a messaging session may be between an SMS device and IM device, two SMS devices, three IM clients, etc.

The messaging session may remain active for any amount of time. However, in one embodiment, a messaging session may be ended if certain conditions are met. For example, if messages are not sent within a certain time period, the messaging session may be purged (i.e., the mappings are deleted). Also, in another example, messaging sessions may remain active until message delivery system 102 cannot handle any more sessions. Then, message delivery system 102 may purge certain sessions. It will be understood that other methods for ending a messaging session may be contemplated and that any combination of the above may be used.

Message delivery system 102 enables users to change devices without manually starting a new messaging session. For example, a first user may decide to change from using an instant message client on a computer to using a cellular phone with SMS. In this case, message delivery system 102 enables instant messages sent from an IM client used by the second user to be sent to the first user using the cellular phone and SMS. Message delivery system 102 also enables the initial messaging session to be continued without the users having to reconnect with each other.

Message delivery system 102 also allows the dynamic update of presence information for users. For example, presence information may indicate a user is actively using certain devices. For example, a user may be logged onto an IM client, which indicates an active presence. Thus, IM may be the preferred way to reach the user. Accordingly, messages may be sent to the IM client at user's IM username. Also, presence information may indicate that a device is powered on, such as a cellular phone. Thus, when a user decides to change devices, the device that a user prefers to use is dynamically updated with message delivery system 102, which then sends messages to the new device. This can occur during the messaging session that is being processed for users and without requiring the user to reconnect to each other.

Figure 2:
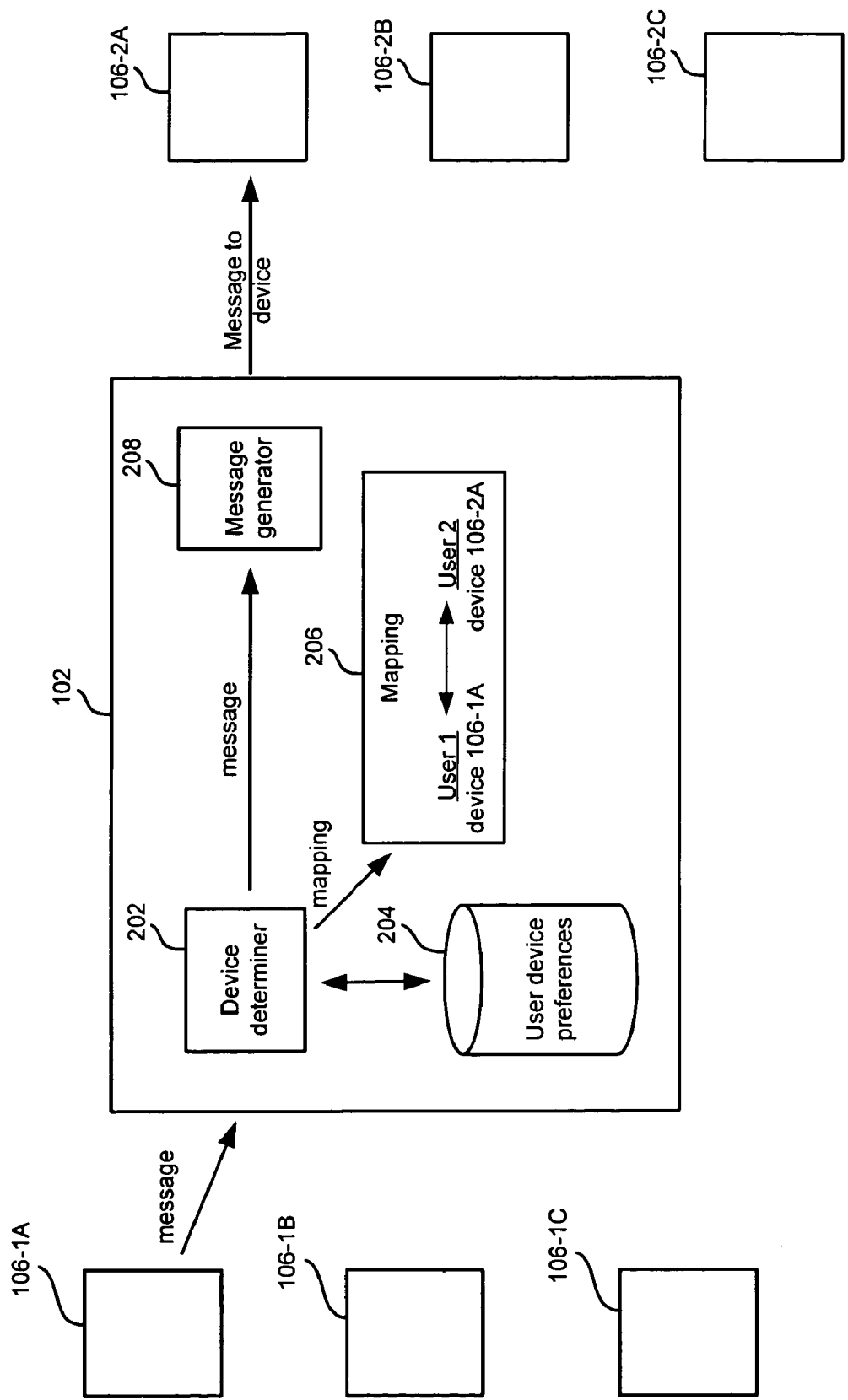
FIG. 2 depicts a process for initiating a messaging session between devices according to one embodiment of the present invention.

FIG. 2 depicts a process for initiating a messaging session between a device 106-1A and a device 106-2A according to one embodiment of the present invention. A first user is associated with device 106-1A and a second user is associated with device 106-2A. In one embodiment, device 106-1A may be an IM client that initiated the messaging session with another IM client 106-2A by sending an IM to a username associated with the second user. Once the messaging session is initiated, messages may be sent back and forth between device 106-1A and device 106-2A during the messaging session. Although IM clients are described it will be understood that other devices 106 may be used. For example, an IM client may initiate a conversation with an SMS device, etc.

The process of initiating a messaging session will now be described. Device 106-1A sends a message to the username associated with device 106-2A. The message is received at a device determiner 202 in message delivery system 102. Thus, messages from device 106-1A are configured to be sent through message delivery system 102. In this case, message delivery system 102 acts as an agent and is essentially sending and receiving messages with device 106-1A. However, device 106-1A believes it is sending and receiving messages to and from device 106-2A.

Messages may be routed to message delivery system 102 in many ways. For example, the message is sent to an address such that network elements, such as a message server, deliver the message to the message delivery system 102. Message delivery system 102 then forwards the message to the real username of the user. Also, the message may be sent to a username and the IM server delivers a copy of the message to message delivery system 102. Message delivery system 102 then forwards a copy of the message to the username.

Device determiner 202 receives the message and is configured to determine a device 106 in which to send the message. In one embodiment, device determiner 202 reviews information found in a database 204 that includes user device preferences. The user device preferences may indicate various devices 106 in which a message may be sent. For example, a user may specify that instant messages sent to a username are sent through SMS to a device 106 using an SMS identifier. Also, a user may specify that email messages to an email address should be sent to a username at an IM client. Accordingly, device determiner 202 determines a device that a user desires to have a message sent. Techniques for determining a device in which to send a message are described in related application U.S. patent application Ser. No. 10/684,686, entitled "Intelligent Messaging", filed Oct. 13, 2003, which is herein incorporated by reference for all purposes.

Once the device 106 in which to send the message is determined, a mapping 206 is stored. The mapping indicates that a messaging session between a user #1 and user #2 has been initiated and also indicates how messages should be routed. The mapping may be stored in many different forms in order to enable messages to be routed between users. In one embodiment, the mapping may include one or more tuples that include information on how to route messages. For example, two tuples for a messaging session may be stored. The first one may be (user#1, destination address A, user #2) and the second one may be (user #2, destination address B, user #1). The mapping indicates that user #1 and user #2 are communicating, and user #2 is associated with a destination address A.

Additionally, users may have mappings for additional messaging sessions, for example, user #2 may have a messaging session with user #3 defined by the tuple (user #2, destination address C, user #3). In one example, message delivery system 102 receives a message with the sender and recipient addresses. The sender address identifies a user and the recipient address identifies the destination address. Using these two, message delivery system 102 can uniquely determine the messaging session and hence the other user of the conversation. For example, if the sender address maps to user #2 and recipient address is destination address C, the tuple (user #2, destination address C, user #3) is selected and hence, message delivery system 102 delivers the message to user #3. The message may be delivered to user #3 at destination address C or to another address associated for user #3. For example, as will be described below, user #3 may switch devices and messages are forwarded to user #3 at the new device.

A mapping is used because devices 106-1A and devices 106-1B are in effect communicating with message delivery system 102. In one embodiment, message delivery system 102 may have pseudo clients that communicate with each device 106. For example, even though device 106-1A is sending messages to device 106-2A, in actuality, the messages are being sent to message delivery system 102. Message delivery system 102 can then map the messages to another address. In effect, message delivery system 102 is maintaining two separate conversations with devices 106-1A and 106-2A.

In the above example, the mapping is initiated but may later be dynamically updated so that messages sent to the second address for the second user are routed to a third address. This process will be described in more detail below.

Message generator 208 sends the message to the address associated with device 106-2A. The message is sent though a communication channel the device communicates in. In one embodiment, message generator 208 may generate a new message and send the message to device 106-2A. For example, a portion of the message received (e.g., the text) may be used to generate a new message. Message generator may generate a new message because the message is being sent in a different communication channel that requires different message formats and/or protocols. For example, if an IM message was sent from device 106-1A for device 106-2A and device 106-2A is the cellular phone in which the user prefers to receive SMS messages, the text of the IM message may be sent in an SMS message generated by message generator 208. It will be recognized in other embodiments, the message received may just be forwarded to device 106-2A.

The message may be configured such that reply messages are sent back to message delivery system 102. For example, a "reply to" address may be an address for message delivery system 102. Thus, device 106-2A may be sending messages to message delivery system 102 but the messaging session is made to look like devices 106-1A and 106-2A are communicating.

Figure 3:
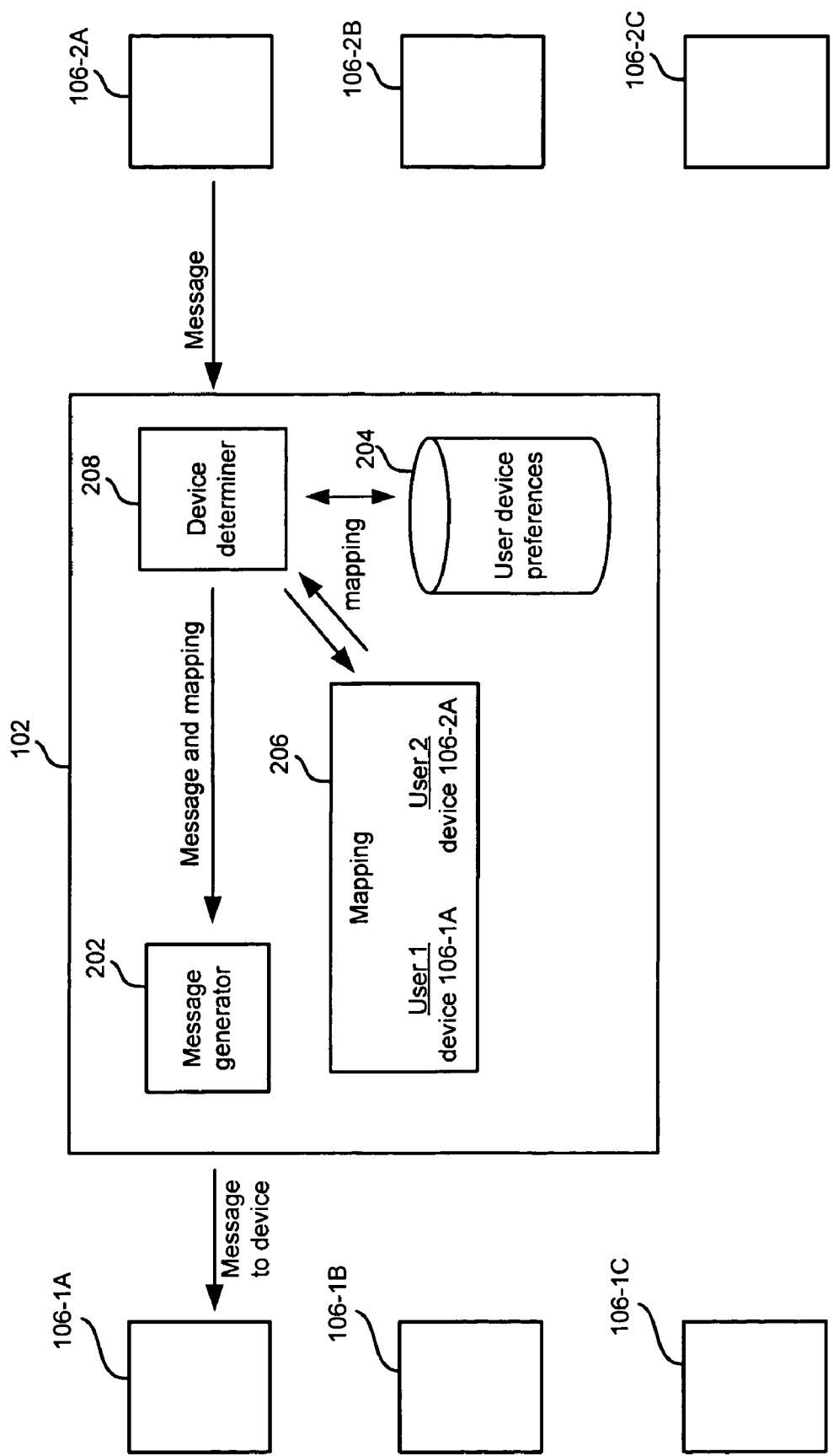
FIG. 3 depicts the process for sending a message from a first device to a second device according to one embodiment of the present invention.

FIG. 3 depicts the process for sending a message from device 106-2A to device 106-1A according to one embodiment of the present invention. Once the messaging session is initiated, devices 106-1A and 106-2A may send messages to each other. This may be done by replying to messages sent and manual reconnection is not necessary. For example, a user may reply to an SMS message. Also, a user may send an IM to a user using an IM client. It will be understood that alternating messages do not need to be sent. For example, the first user may send multiple messages without receiving a response from the second user, and vice versa.

Device 106-2A sends a message in the messaging session initiated by device 106-1A. The message is addressed to the "reply to" address supplied by message delivery system 102. In another example, the message is sent to an address for device 106-1A. In one example, an IM messaging session may have been initiated between two IM clients. The second user then types a message in the IM client and selects send. The IM is sent to an address for message delivery system 102. The IM may also be sent to an address for the first user at device 106-1A but may be redirected to message delivery system 102.

The message is then received at device determiner 202 of message delivery system 102. Device determiner 202 determines that the message is sent from device 106-2A and is configured to determine if the message is associated with an already initiated messaging session. In one embodiment, device determiner 202 uses mappings in database 206 to determine if the message is associated with an already initiated messaging session. For example, device determiner 202 may look up the address for device 106-2A in database 204 to determine a user that is associated with the address. The mappings are then reviewed to determine any mappings for that user. The mapping for the messaging session described above indicates that user #2 is communicating with user #1. For example, the tuple (user #2, destination address B, user #1) may be found in the mapping. The message is then sent to user #1 at destination address B.

In one embodiment, users may be associated with multiple messaging sessions and have multiple mappings. For example, user #2 may have a messaging session with a user #3 and may have a tuple such as described above as (user #2, destination address C, user #3). In order to determine the correct messaging session, the destination address for the message may be used to determine the messaging session. If the message is for an address of user #1, then the messaging session with that user is used.

In another example, device determiner 202 may look up the address for device 106-2A in the mappings to determine if that address is associated with another user or address. For example, the address for device 106-2A may be associated with user #1 and/or the address for device 106-1A.

Message generator 208 is then configured to generate a message to send to device 106-1A based on the mappings. The message may be generated as described above.

Accordingly, device 106-2A is able to reply to a message sent from device 106-1A. Device 106-2A believes that a direct messaging session with device 106-1A has been initiated. However, messages sent to device 106-1A are received by message delivery system 102, processed using the mappings, and then sent to device 106-1A.

Figure 4:
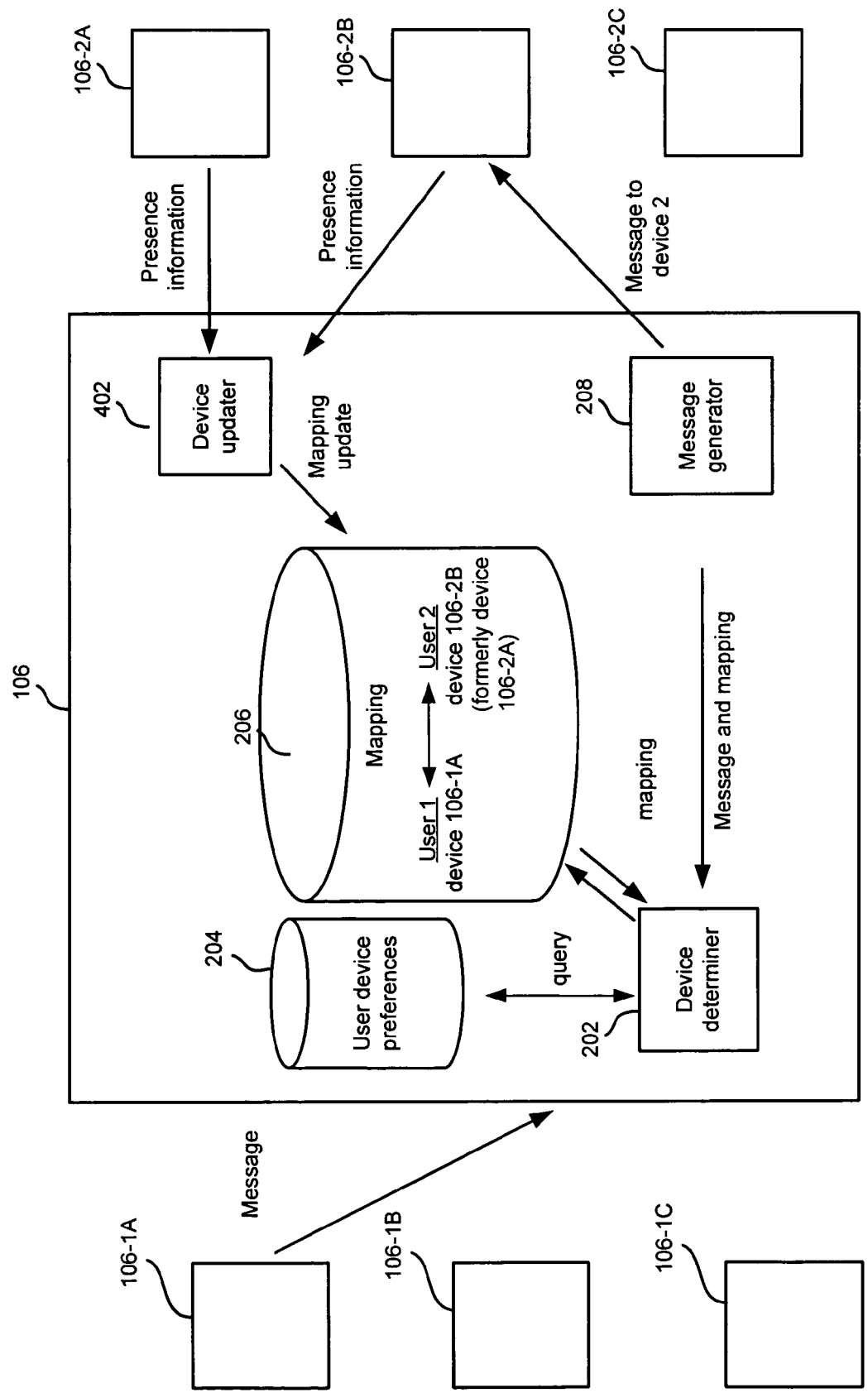
FIG. 4 depicts a process for sending messages to a different device for a user according to one embodiment of the present invention.

FIG. 4 depicts a process for sending messages to a different device for a user according to one embodiment of the present invention. During a messaging session, a user may decide to use a different device than the one currently being used. Conventionally, the messaging session has to be terminated and a new one has to be started. Message delivery system 102, however, enables messages to be sent to another device without requiring users to manually reconnect with each other.

Device updater 402 is configured to update the mappings in database 206. For example, the mapping from user #1 to user #2 may be updated. The mapping may be from a first address for device 106-1A to a second address for device 106-2A. The mapping may then be updated to indicate that messages sent from user #1 should be routed to user #2 at a third address for device 106-2B. Also, the mapping may be updated such that messages from device 106-2B are sent to the address associated with device 106-1A. For example, the mapping may be updated to be (user #1, destination address A->destination address D, user #2). This mapping may indicate that messages from user #1 to destination address A should be routed to user #2 at destination address D. In another example, the mapping (user #1, destination address A, user #2) may be used to determine user #2 should receive the message. Then, message delivery system 102 determines a device to send the message to. For example, user preferences may indicate that the message should be sent to destination address D.

Thus, user #1 can send a message to user #2 and it will be routed to user #2 at the third address. In one embodiment, the message may be sent to the address for device 106-2A Message delivery system 102 determines that the message is sent from user #1. From the mapping, message delivery system 102 determines that the message should be sent to user #2. For example, the first address may be used to determine that the message is from user #1. The mapping indicates that messages from user #1 should be sent to user #2. Then, it is determined that the message should be sent to user #2 at the third address.

Also, the first or second address may be used to determine the mapping. For example, the mapping may indicate that messages sent from the first address or message sent to the second address from user #1 should be routed to the third address. In this case, user #1 may send a message from any device because message delivery system 102 can determine that the message is from user #1 and can map it to the messaging session with user #2.

User #2 may also send the first message after switching devices. For example, device 106-2B can send a first message by sending the message to the address of message delivery system 102. This is possible because the mapping for an address of message delivery system 102 is maintained between user #1 and user #2. Message delivery system 102 determines that user #2 sent the message from the address of device 106-2B before checking the mapping. Message delivery system 102 then determines that the message should be sent to user #1 at the first address from the mapping of user #2 to user #1. Also, device 106-2B can send a first message to an address for device 106-1A such that the message goes through message delivery system 102. In this case, message delivery system 102 uses the mapping for the messaging session between user #1 and user #2, and delivers the message to the address for device 106-1A.

The mapping may be updated based on information, such as the message content, device capabilities, the user's static preferences, or the user's dynamic preferences. In one embodiment, the second user may decide that he/she would rather use a device other than device 106-2A to communicate with the first user. The second user may then send a message to message delivery system 102 indicating that the messages should be sent to another device 106. Device updater 402 then updates the mapping found in database 206 to indicate this event. Accordingly, messages to the second user are sent to the specified device.

Also, message delivery system 102 may dynamically update the mapping. For example, message delivery system 102 may detect presence information and determine a device 106 in which to send messages to the second user. In one embodiment, user #2 may turn off or log off device 106-2A. For example, if an instant message IM client has been used, the user may log off the IM client. Presence information may then be received at message delivery system 102 that indicates a user has logged off the IM client. Device updater 402 then updates the mapping found in database 206 to indicate this event.

The user may then log on or turn on a device 106, such as device 106-2B, and presence information is received at device updater 402. For example, a user may turn on a cellular phone and log onto an IM client on the cellular phone. Presence information is then received at message delivery system 102 indicating the user has logged on with device 106-2B. Also, a user may turn on the cellular phone and send a message to message delivery system 102 indicating that messages to the user should be sent to this device 106-2B.

In another embodiment, a user may have static preferences. For example, a user may specify a ranking of devices that should be used. The ranking may indicate that when an active device is not specified, a first device 106 should by sent messages. Also, other devices 106 may be listed in case the message to the first device 106 fails. Moreover, different devices in different situations may be specified. For example, if SMS messages are received, it may be specified that they be sent to an address at a cellular phone through the SMS channel. Device updater 402 then updates the mapping found in database 206 to indicate the change based on the static preferences.

When device 106-1A sends a message in the messaging session, message delivery system 102 receives the message. Device determiner 202 is then configured to determine a device for the second user in which to send the message. Device determiner 202 may review the mappings in database 206 to determine that user #2 should receive the message. Then, a device in which a message should be sent to is determined for user #2. For example, a mapping may indicate that a message sent from an address for device 106-1A should be sent to an address associated with device 106-2B. Although different devices are described, device 106 may be the same device 106 but different addresses and/or communication channels are being used.

As described above, message generator 208 is configured to generate a message to send to device 106-2B based on the mapping determined. For example, device 106-2B may be a cellular phone in which a user wants to receive SMS messages. Message generator 208 may take the instant message sent from device 106-1A and generate a corresponding SMS message using a portion of the IM (e.g., the text or body of the message). The SMS message is then sent through an SMS communication channel to device 106-2B.

Accordingly, bi-directional messaging between devices is enabled using message delivery system 102. The bi-directional messaging is enabled for a messaging session in which a user may change devices during a messaging session. When a user changes devices, a mapping may be dynamically updated such that message delivery system 102 may route messages that are sent in the messaging session to another device for the user.

It will also be recognized that messaging may be enabled for more than two users. For example, an IM chat between three or more users may be enabled where users may change devices. The mapping may map all three users to the messaging session and is processed as described above.

It should be noted that the above process may continue. For example, messages between the first and second users may continue to be sent. Also, the first or second user may change devices again. The process described above may then be used to continue the messaging session between the users with the new devices.

Accordingly, embodiments of the present invention enable a messaging session to continue even if users change devices during the conversation. Updates are received and the system is configured to send messages to the new device. Thus, a user does not have to manually reconnect with the other user in order to continue with the messaging session.

Figure 5:
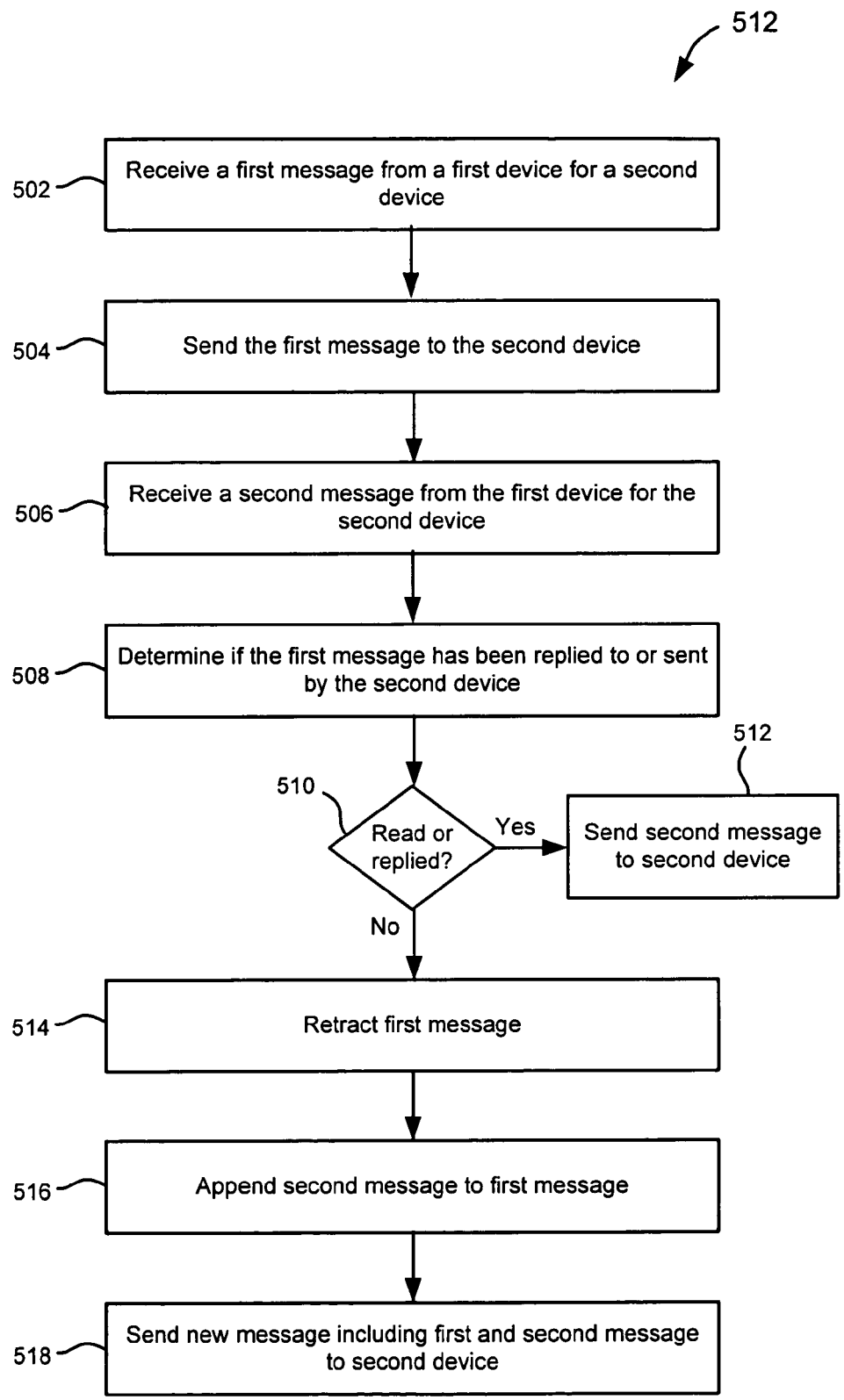
FIG. 5 depicts a simplified flowchart of a method for compressing messages according to one embodiment of the invention.

In one embodiment, message delivery system 102 may compress messages that are sent to device. FIG. 5 depicts a simplified flowchart 500 of a method for compressing messages according to one embodiment of the present invention. In step 502, a first message is received from a first device for a second device. In step 504, the first message is sent to the second device. For example, an instant message may have been received and sent to the second device.

In step 506, a second message from the first device for the second device is received. For example, a MMS message may be sent to the second device. Although MMS is described, it will be understood that other messages may be sent, such as SMS messages, email messages, etc.

In step 508, it is determined that the first message has been replied to or read by the second device. For example, a user may not have opened a MMS message on the second device or replied to the message. If a conversation is being processed between the first and second devices, because the medium's communication capabilities may be different, it may be desired that messages are compressed. For example, while two IM clients are interacting and sending messages between each other, it is easy for users to send multiple messages and have them displayed on the IM client. However, if multiple instant messages are sent from an IM client and converted into MMS messages, the multiple MMS messages sent to the second device would be hard to read for the second user. A user may have to open up each MMS message that corresponds to an IM sent. This may take a lot longer than if new messages just appeared in IM client window.

In step 510, it is determined if the message was read and/or replied to. If the message was replied to, in step 512, the second message is sent to the second device. In this case, the message has already been read so the second message is just sent.

If the message has not been read and/or replied to in step 514, the first message is retracted. In step 516, the second message is then appended to the first message to form a new message.

In step 518, the new message is sent to the second device. Accordingly, the first and second message is sent in the new message and can be read in one MMS message at the second device. Often, in conversation, a user may send multiple messages but those messages may be more easily read if they appear together. Thus, a user does not have to open two different MMS messages. This saves time and keystrokes for a user. Also, because a conversation is taking place, the two MMS messages may be more easily understood if they are together. The above process described may also be used for any number of messages. For example, a third message may be appended to the new message, and so on.

The above process is useful when different communication channels are communicating. For example, in instant messaging, users often type multiple messages to be sent another user. In some cases, sentences often are split into multiple messages. However, for users using MMS, receiving multiple messages may be undesirable because users have to open each MMS message separately. Also, the MMS messages do not appear in the same streaming form as shown in an instant message client. Thus, by compressing messages that have not been read or replied to, a user can review a single message with the entire conversation that has not been read by a user.

While the present invention has been described using a particular combination of hardware and software implemented in the form of control logic, it should be recognized that other combinations of hardware and software are also within the scope of the present invention. The control logic may be included on a computer readable medium. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for processing messages during a messaging session, the method comprising:
    maintaining a mapping between a first device and a second device for the messaging session;

determining an update for the mapping, the update specifying a third device that is being used instead of the second device;
updating the mapping based on the update determined;
receiving a first message from the first device during the messaging session;
determining, from the updated mapping, that the first message should be sent to the third device; and
sending at least a portion of the first message to the third device;
receiving a second message from the first device during the messaging session;
determining whether the at least a portion of the first message has been read or replied to;
retracting the at least a portion of the first message based on the determination whether the at least a portion of the first message has been read or replied to;
combining the at least a portion of the first message and at least a portion of the second message to generate a third message; and
sending the third message to the third device.

2. The method of claim 1, wherein an initial connection between the third device and the first device is not initiated by the first device or third device.

3. The method of claim 1, further comprising:
before receiving the update, receiving a fourth message from the first device; and
determining from the mapping that the fourth message should be sent to the second device; and
sending the fourth message to the second device, wherein the fourth message and first message are sent in the same messaging session.

4. The method of claim 1, wherein the updated mapping indicates that messages received from an address associated with the first device should be sent to an address associated with the third device.

5. The method of claim 1, wherein determining the update for the mapping comprises using presence information from at least one of the second device and third device to determine the update.

6. The method of claim 5, wherein presence information indicates that the third device is active.

7. The method of claim 1, wherein determining the update for the mapping comprises using user preferences for a user of the second device to determine the update.

8. The method of claim 1, wherein the mapping is updated dynamically during the messaging session.

9. The method of claim 1, wherein the third device communicates in a different communication channel than the second device.

10. The method of claim 1, further comprising:
receiving a fourth message from the first device during the messaging session;
determining if at least a portion of the fourth message sent has been read or replied to;
if the at least a portion of the fourth message has not been read or replied to, performing the steps of:
retracting the at least a portion of the fourth message;
combining the at least a portion of the fourth message and at least a portion of a fifth message into a sixth message; and
sending the sixth message to the third device.

11. A method for maintaining a messaging session between a first user and a fourth user, the method comprising:
establishing the messaging session between the first user for a second user, wherein messages are sent between a first user at a first address and a second user at a second address;
determining an update for the second user specifying a third address; and
maintaining the messaging session between the first user and second user, wherein messages are sent between the first user at the first address to the second user at the third address;
wherein maintaining the messaging session comprises:
determining whether a first message sent between the first user at the first address to the second user at the third address has been read or replied to;
retracting at least a portion of the first message based on the determination whether the first message has been read or replied to;
combining the at least a portion of the first message with at least a portion of a second message into a third message; and
sending at least a portion of the third message to the second user at the third address.

12. The method of claim 11, wherein an initial connection between a first device associated with the third address and a second device associated with the third address device is not initiated by the first device or third device.

13. The method of claim 11, further comprising:
maintaining a mapping for the messaging session, wherein the mapping is updated to indicate that messages from the first user at the first address should be sent to the third address after the update is determined.

14. The method of claim 13, wherein the mapping is updated to indicate that messages from the second user at the third address should be sent to the first user at the first address.

15. The method of claim 11, wherein the second address is associated with a first device and the third address is associated with a second device.

16. The method of claim 15, wherein the first device communicates in a first communication channel and the second device communicates in a second communication channel.

17. The method of claim 11, wherein determining the update comprises using presence information for a device associated with the second user to determine the update.

18. The method of claim 17, wherein presence information indicates that the device is active.

19. The method of claim 11, wherein determining the update comprises using user preferences for the second user to determine the update.

20. The method of claim 11, wherein the update is determined dynamically during the messaging session.

21. The method of claim 11, wherein maintaining the messaging session further comprises:
receiving a fourth message for the first user from the second user;
sending at least a portion of the fourth message to the first user;
receiving a fifth message for the first user from the second user;
determining if the at least a portion of the fourth message sent to the first user has been read or replied to;
if the at least a portion of the fourth message has not been read or replied to, performing the steps of:
retracting the at least a portion of the fourth message;
combining the at least a portion of the fourth message and at least a portion of the fifth message into a sixth message; and sending at least a portion of the sixth message to the first user.

22. A method for processing messages for a user, the method comprising:

receiving a first message for a first user from a second user;

sending at least a portion of the first message to the first user based on a mapping maintained between a first device and a second device for a messaging session between the first user and the second user;

receiving a second message for the first user from the second user;

determining if the at least a portion of the first message sent to the first user has been read or replied to;

if the at least a portion of the first message has not been read or replied to, performing the steps of:

retracting the at least a portion of the first message;

combining the at least a portion of the first message and at least a portion of the second message into a third message; and sending the third message to a third device associated with the first user based on an update to the mapping that identifies the third device.

23. The method of claim 22, wherein the first message is sent in a different communication channel than the second and third messages.

24. A system for processing message, the system comprising:

a first set of electronic devices associated with a first user;

a second set of electronic devices associated with a second user; and a message delivery system configured to route messages between the first user and the second user, the message delivery system comprising:

a messaging session initiator configured to generate a mapping to map messages from a first device in the first set of electronic devices to a second device in the second set of electronic devices and the messages received from the second device to the first device; and an updater configured to update the mapping to map messages from the first device to a third device in the second set of electronic devices and the messages received from the third device to the first device;

a message generator configured to generate a combined message to be routed by the message delivery system based on at least a portion of a first message sent to one of the first user or the second user and at least a portion of a second message received for the one of the first user or the second user, the combined message generated in response to retracting the at least a portion of the first message send to the one of the first user or the second user based on a determination whether the at least a portion of the first message has been read or replied to by the one of the first user or the second user;

wherein a messaging session between the first user and second user is maintained after the updater updates the mapping.

25. The system of claim 24, further comprising a device determiner configured to receive a message from the first device, wherein device determiner is configured to determine that the message should be sent to the second device based on the mapping.

26. The system of claim 25, further comprising a message sender configured to send at least a portion of the message to the second device.

27. The system of claim 26, wherein the device determiner is configured to receive a second message from the second device and configured to determine that the second message should be sent to the first device based on the mapping.

28. The system of claim 27, wherein the message sender is configured to send at least a portion of the second message to the first device.

29. The system of claim 24, further comprising a device determiner configured to receive a message from the first device and configured to determine that the message should be sent to the third device based on the updated mapping.

30. The system of claim 29, further comprising a message sender configured to send at least a portion of the message to the third device.

31. The system of claim 24, wherein the second device and the third device communicate in different communication channels.

32. The system of claim 24, an initial connection between the first device and the third device is not initiated by the first device or third device.

33. A computer readable medium configured to store logic operational with a computor system for processing messages during a messaging session, the computer readable medium comprising:

logic configured to maintain a mapping between a first device and a second device for the messaging session;

logic configured to determine an update for the mapping, the update specifying a third device that is being used instead of the second device;

logic configured to update the mapping based on the update determined;

logic configured to receive a first message from the first device during the messaging session;

logic configured to determine, from the updated mapping, that the first message should be sent to the third device;

logic configured to send at least a portion of the first message to the third device;

logic configured to receive a second message from the first device during the messaging session;

logic configured to determine whether the at least a portion of the first message has been read or replied to;

logic configured to retract the at least a portion of the first message based on the determination whether the at least a portion of the first message has been read or replied to;

logic configured to combine the at least a portion of the first message and at least a portion of the second message to generate a third message; and logic configured to send at least a portion of the third message to the third device.

34. The computer readable medium of claim 33, wherein an initial connection between the third device and the first device is not initiated by the first device or third device.

35. The computer readable medium of claim 33, wherein the updated mapping indicates that messages received from an address associated with the first device should be sent to an address associated with the third device.

36. The computer readable medium of claim 33, wherein the logic configured to determine the update for the mapping comprises logic configured to use presence information from at least one of the second device and third device to determine the update.

37. The computer readable medium of claim 33, wherein the logic configured to determine the update for the mapping comprises logic configured to use user preferences for a user of the second device to determine the update.

38. The computer readable medium of claim 33, wherein the mapping is updated dynamically during the messaging session.

39. The computer readable medium of claim 33, wherein the third device communicates in a different communication channel than the second device.

40. The computer readable medium of claim 33, further comprising:
   logic configured to receive a fourth message from the first device during the messaging session;
   logic configured to determine if the at least a portion of the fourth message sent has been read or replied to;
   if the at least a portion of the fourth message has not been read or replied to, logic configured to:
      retract the at least a portion of the fourth message;
      combine the at least a portion of the fourth message and at least a portion of a fifth message into a sixth message; and
      send the sixth message to the third device.

41. A computer readable medium configured to store logic operation with a computer system for maintaining a messaging session between a first user and a second user, the computer readable medium comprising:
   logic configured to establish the messaging session between the first user for a second user, wherein messages are sent between a first user at a first address and a second user at a second address;
   logic configured to determine an update for the second user specifying a third address; and
   logic configured to maintain the messaging session between the first user and second user, wherein messages are sent between the first user at the first address to the second user at the third address;
   wherein the logic configured to maintain the messaging session comprises:
      logic configured to determine whether a first message sent between the first user at the first address to the second user at the third address has been read or replied to;
      logic configured to retract at least a portion of the first message based on the determination whether the first message has been read or replied to;
      logic configured to combine the at least a portion of the first message with at least a portion of a second message into a third message; and
      logic configured to send at least a portion of the third message to the second user at the third address.

42. The computer readable medium of claim 41, wherein an initial connection between a first device associated with the third address and a second device associated with the third address device is not initiated by the first device or third device.

43. The computer readable medium of claim 41, further comprising:
   logic configured to maintain a mapping for the messaging session, wherein the mapping is updated to indicate that messages from the first user at the first address should be sent to the third address after the update is determined.

44. The computer readable medium of claim 43, wherein the mapping is updated to indicate that messages from the second user at the third address should be sent to the first user at the first address.

45. The computer readable medium of claim 41, wherein the second address is associated with a first device and the third address is associated with a second device.

46. The computer readable medium of claim 45, wherein the first device communicates in a first communication channel and the second device communicates in a second communication channel.

47. The computer readable medium of claim 41, wherein the logic configured to determine the update comprises logic configured to use presence information for a device associated with the second user to determine the update.

48. The computer readable medium of claim 47, wherein presence information indicates that the device is active.

49. The computer readable medium of claim 41, wherein the update is determined dynamically during the messaging session.

50. The computer readable medium of claim 41, further comprising:
   logic configured to receive a fourth message for the first user from the second user;
   logic configured to send at least a portion of the fourth message to the first user;
   logic configured to receive a fifth message for the first user from the second user;
   logic configured to determine if the at least a portion of the fourth message sent to the first user has been read or replied to;
   if the at least a portion of the fourth message has not been read or replied to, logic configured to:
      retract the at least a portion of the fourth message;
      combine the at least a portion of the fourth message and at least a portion of the fifth message into a sixth message; and
      send at least a portion of the sixth message to the first user.

51. A computer readable medium configured to store logic operational whith a computer system for processing messages for a user, the computer readable medium comprising:
   logic configured to receive a first message for a first user from a second user;
   logic configured to send at least a portion of the first message to the first user based on a mapping maintained between a first device and a second device for a messaging session between the first user and the second user;
   logic configured to receive a second message for the first user from the second user;
   logic configured to determine if the at least a portion of the first message sent to the first user has been read or replied to;
   if the at least a portion of the first message has not been read or replied to, logic configured to:
      retract the at least a portion of the first message;
      combine the at least a portion of the first message and at least a portion of the second message into a third message; and
      send the third message to a third device associated with the first user based on an update to the mapping that identifies the third device.

52. The computer readable medium of claim 51, wherein the first message is sent in a different communication channel than the second and third message.

* * * * *

UNITED STATES PATENT AND TRADEMARK OFFICE
CERTIFICATE OF CORRECTION

PATENT NO. : 7,403,973 B2  Page 1 of 1
APPLICATION NO. : 10/857555
DATED : July 22, 2008
INVENTOR(S) : Wilsher et al.

It is certified that error appears in the above-identified patent and that said Letters Patent is hereby corrected as shown below:

In column 7, line 64, after "106-2A" insert -- . --.

In column 11, line 67, in claim 11, delete "fourth" and insert -- second --, therefor.

In column 14, line 23, in claim 33, delete "computor" and insert -- computer --, therefor.

In column 15, line 21, in claim 41, delete "operation" and insert -- operational --, therefor.

In column 16, line 37, in claim 51, delete "whith" and insert -- with --, therefor.

In column 16, line 61, in claim 52, delete "message." and insert -- messages. --, therefor.

Signed and Sealed this

Twenty-second Day of December, 2009

David J. Kappos
*Director of the United States Patent and Trademark Office*